United States Patent
Kim et al.

(10) Patent No.: US 12,063,612 B2
(45) Date of Patent: Aug. 13, 2024

(54) METHOD AND APPARATUS FOR HANDLING OF MISSING REFERENCE SIGNAL ON UNLICENSED FREQUENCY IN A WIRELESS COMMUNICATION SYSTEM

(71) Applicant: LG ELECTRONICS INC., Seoul (KR)

(72) Inventors: Sangwon Kim, Seoul (KR); Sunghoon Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 409 days.

(21) Appl. No.: 17/310,951

(22) PCT Filed: Apr. 28, 2020

(86) PCT No.: PCT/KR2020/005563
§ 371 (c)(1),
(2) Date: Sep. 1, 2021

(87) PCT Pub. No.: WO2020/222492
PCT Pub. Date: Nov. 5, 2020

(65) Prior Publication Data
US 2022/0086784 A1    Mar. 17, 2022

Related U.S. Application Data

(60) Provisional application No. 62/842,504, filed on May 2, 2019.

(51) Int. Cl.
*H04W 56/00* (2009.01)
*H04W 16/14* (2009.01)
(52) U.S. Cl.
CPC ....... *H04W 56/0035* (2013.01); *H04W 16/14* (2013.01)

(58) Field of Classification Search
CPC . H04W 56/0035; H04W 16/14; H04W 76/19; H04W 76/00–30; H04W 16/00;
(Continued)

(56) References Cited

U.S. PATENT DOCUMENTS

2016/0192269 A1* 6/2016 Kim ................ H04W 36/0072
                                              370/332
2020/0274657 A1* 8/2020 Deenoo ................ H04L 1/203
(Continued)

FOREIGN PATENT DOCUMENTS

WO    2019050789    3/2019

OTHER PUBLICATIONS

3GPP 38-331 V15.3.0 (Year: 2018).*
(Continued)

*Primary Examiner* — Ricky Q Ngo
*Assistant Examiner* — David M Kayal
(74) *Attorney, Agent, or Firm* — LEE, HONG, DEGERMAN, KANG & WAIMEY

(57) ABSTRACT

A method and apparatus for handling of missing reference signal on unlicensed frequency in a wireless communication system is provided. The upper layer of the wireless device receives, from a lower layer of the wireless device, a first indication related to a first reference signal from a network, wherein the first indication is one of In-Sync (IS) indication or Out-of-Sync (OOS) indication. The upper layer of the wireless device starts a timer. The upper layer of the wireless device receives, from the lower layer of the wireless device, a second indication while the timer is running, wherein the second indication informs that a second reference signal from the network is missing. The upper layer of the wireless device increases a counter related to the first indication upon receiving the second indication.

4 Claims, 13 Drawing Sheets

(58) Field of Classification Search
CPC ......... H04W 24/00–10; H04W 28/0236–0284;
H04W 74/00–04; H04L 5/0048
See application file for complete search history.

(56) References Cited

U.S. PATENT DOCUMENTS

2021/0243808 A1* 8/2021 Deenoo ................... H04L 5/005
2021/0321277 A1* 10/2021 Murray ............... H04W 56/001
2022/0021476 A1* 1/2022 Mo ....................... H04L 1/0026

OTHER PUBLICATIONS

3GPP TSG-RAN WG2 Meeting #105bis, R2-1903550 (Year: 2019).*
InterDigital, Inc., "Initial Access and Mobility Procedures in NR-U," 3GPP TSG RAN WG1 #96bis, R1-1904854, Apr. 2019, 7 pages.
InterDigital, Inc., "RLM and RLF for NR-U," 3GPP TSG-RAN WG2 Meeting #105bis, R2-1903550, Apr. 2019, 4 pages.
Huawei, et al., "Discussion on RLF for NR-U," 3GPP TSG-RAN WG2 Meeting #105bis, R2-1904408, Apr. 2019, 4 pages.
Ericssion, "Handling DL LBT failures," 3GPP TSG-RAN WG2 #105bis, Tdoc R2-1904751, Apr. 2019, 3 pages.
3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.3.0, Section 5.7, Sep. 2018, 79 pages.
3rd Generation Partnership Project (3GPP), "Technical Specification Group Radio Access Network; NR; Radio Resource Control (RRC) protocol specification (Release 15)," 3GPP TS 38.331 V15.3.0, Section 5.3.10, Sep. 2018, 101 pages.

* cited by examiner

METHOD AND APPARATUS FOR HANDLING OF MISSING REFERENCE SIGNAL ON UNLICENSED FREQUENCY IN A WIRELESS COMMUNICATION SYSTEM

CROSS-REFERENCE TO RELATED APPLICATIONS

This application is the National Stage filing under 35 U.S.C. 371 of International Application No. PCT/KR2020/005563, filed on Apr. 28, 2020, which claims the benefit of U.S. Provisional Patent Application No. 62/842,504, filed on May 2, 2019, the contents of which are all incorporated by reference herein in their entirety.

TECHNICAL FIELD

The present disclosure relates to a method and apparatus for handling of missing reference signal on unlicensed frequency in a wireless communication system.

RELATED ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

NR supports operations in unlicensed bands through NR-based access to unlicensed spectrum. It is similar to Licensed-Assisted Access (LAA) and LTE Unlicensed (LTE-U). The primary objective of NR-U is to extend the applicability of NR to unlicensed spectrum bands. Regarding the deployment modes, NR-U supports carrier aggregation, dual connectivity, and standalone operation in unlicensed.

One of the issues to operate in unlicensed spectrum is to ensure a fair and harmonious coexistence with other unlicensed systems. Listen Before Talk (LBT) is a spectrum sharing mechanism by which a device senses the channel using a Clear Channel Assessment (CCA) check before accessing to it. LBT works across different RATs, and it is adopted by LAA, MulteFire, Wi-Fi, and WiGig to comply with the regulation.

When LBT is applied, the transmitter listens to/senses the channel to determine whether the channel is free or busy. If the channel is determined to be free, the transmitter may perform the transmission. Otherwise, it does not perform the transmission.

On the other hand, in 5G, for radio link monitoring (RLM), both synchronization signal (SS) block SS block based RLM and channel state information-reference signal (CSI-RS) based RLM are supported. A wireless device may determine in-sync (IS) and out-of-sync (OOS) with a cell, based on the radio link monitoring-reference signal (RLM-RS) (for example, SS block or CSI-RS.

A wireless device may use the OOS or the IS to monitor the cell. For example, upper layers of a wireless device may consider that radio link failure (RLF) is happened based on receiving consecutive OOS indications. For other example, upper layers of a wireless device may stop to consider that the RLF is happened based on receiving consecutive IS indications.

SUMMARY

On unlicensed frequency, if the channel is busy, the network could not transmit the RLM-RS to the wireless device and a wireless device could not receive the RLM-RS from the network.

While the RLM-RS is missing, the upper layers (e.g., RRC layer) of the wireless device may not receive the OOS indication or the IS indication from the lower layers (e.g., physical layer) of the wireless device. Therefore, the wireless device could not proceed to monitor the cell while the RLM-RS is missing.

In particular, the upper layers of the wireless device could not consider that the RLF is happened even though the wireless device does not receive the OOS indication or the IS indication from the lower layers of the wireless device for a long time. Thus, that the RLF declaration could be delayed significantly.

Therefore, studies for handling of missing reference signal on unlicensed frequency in a wireless communication system are required.

In an aspect, a method performed by an upper layer of a wireless device in a wireless communication system is provided. The upper layer of the wireless device receives, from a lower layer of the wireless device, a first indication related to a first reference signal from a network, wherein the first indication is one of In-Sync (IS) indication or Out-of-Sync (OOS) indication. The upper layer of the wireless device starts a timer. The upper layer of the wireless device receives, from the lower layer of the wireless device, a second indication while the timer is running, wherein the second indication informs that a second reference signal from the network is missing. The upper layer of the wireless device increases a counter related to the first indication upon receiving the second indication.

In another aspect, a wireless device in a wireless communication system is provided. The wireless device includes a transceiver, a memory, and at least one processor operatively coupled to the transceiver and the memory. The processor is configured to control an upper layer of the wireless device to receive, from a lower layer of the wireless device, a first indication related to a first reference signal from a network, wherein the first indication is one of In-Sync (IS) indication or Out-of-Sync (OOS) indication. The processor is configured to control the upper layer of the wireless device to start a timer. The processor is configured to control the upper layer of the wireless device to receive, from the lower layer of the wireless device, a second indication while the timer is running, wherein the second indication informs that a second reference signal from the network is missing. The processor is configured to control the upper layer of the wireless device to increase a counter related to the first indication upon receiving the second indication.

The present disclosure can have various advantageous effects.

According to some embodiments of the present disclosure, a method and apparatus for handling the missing RS indication as IS indication or OOS indication is provided.

For example, a wireless device may configure a correlation window or a correlation timer to consider the missing RS indication as IS indication or OOS indication.

For example, a wireless device may not declare unnecessary RLF on unlicensed frequency.

For another example, a wireless device may declare RLF and start recovery procedure without unnecessary delay on unlicensed frequency.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION

Figure 1:
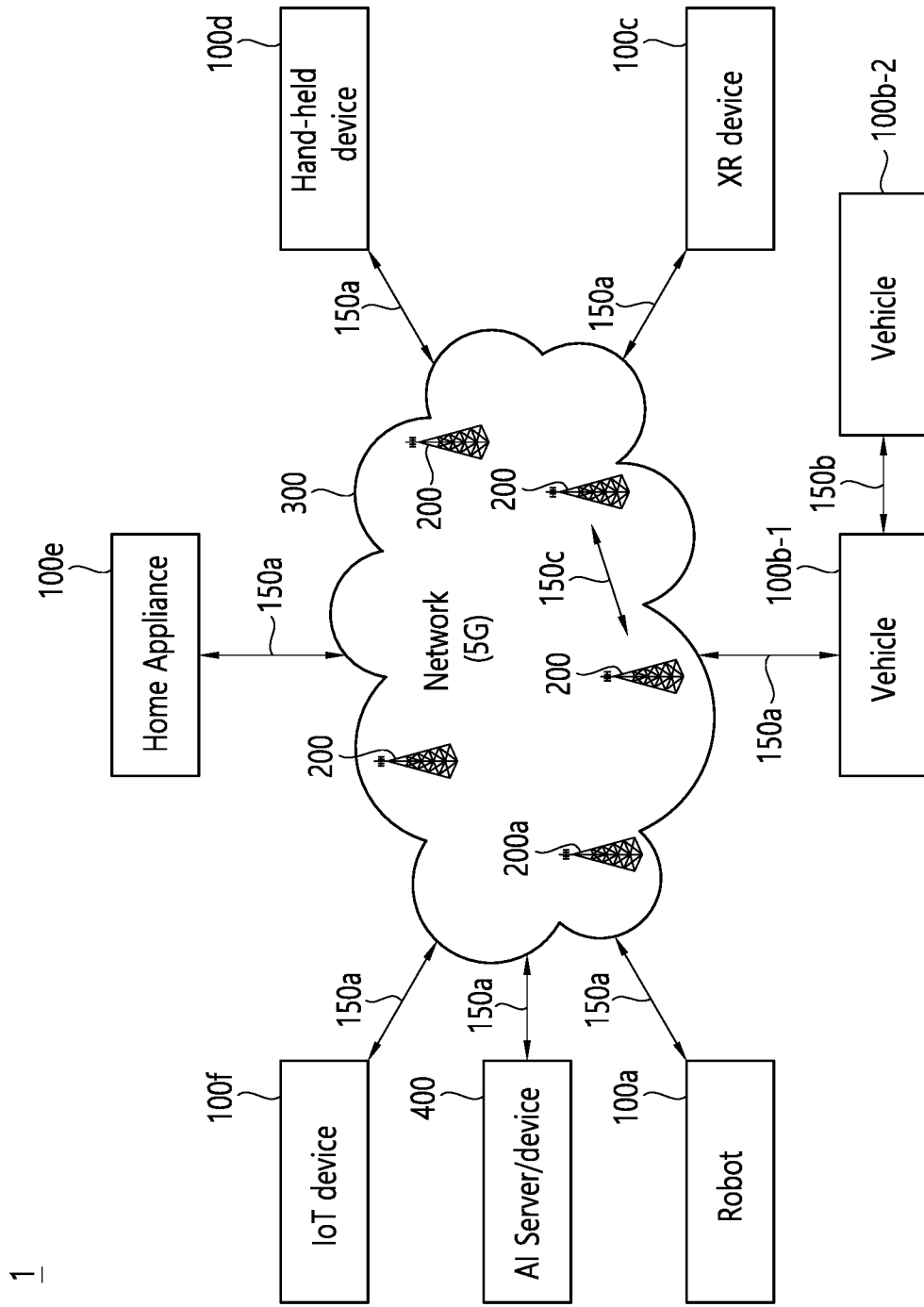
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Figure 2:
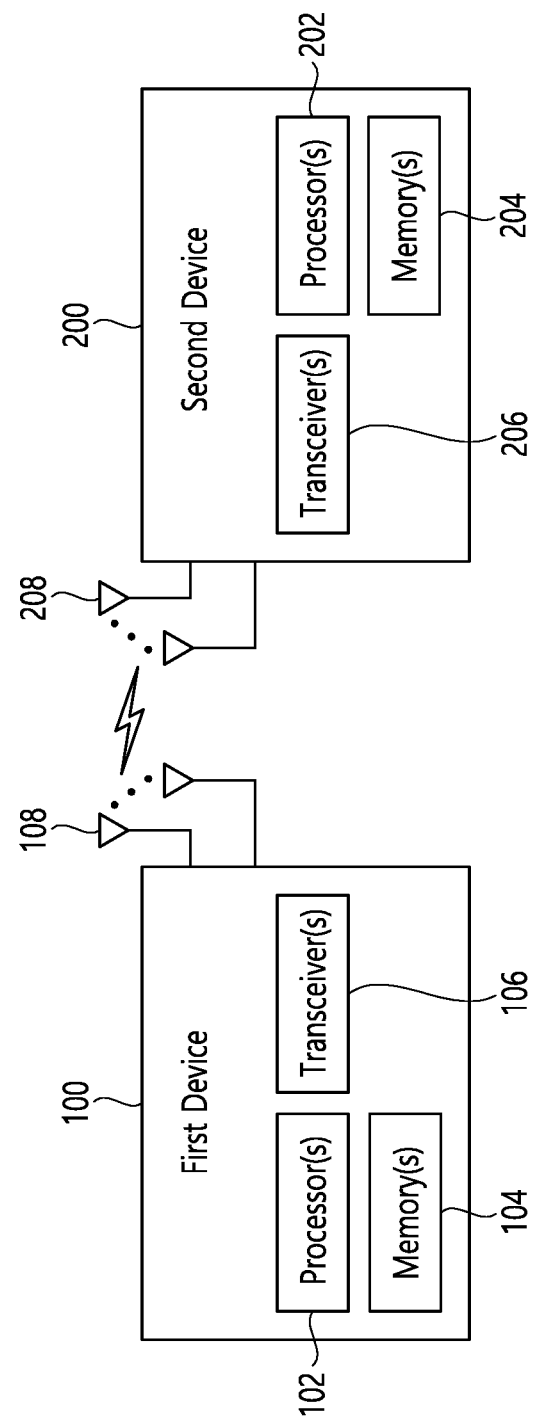
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
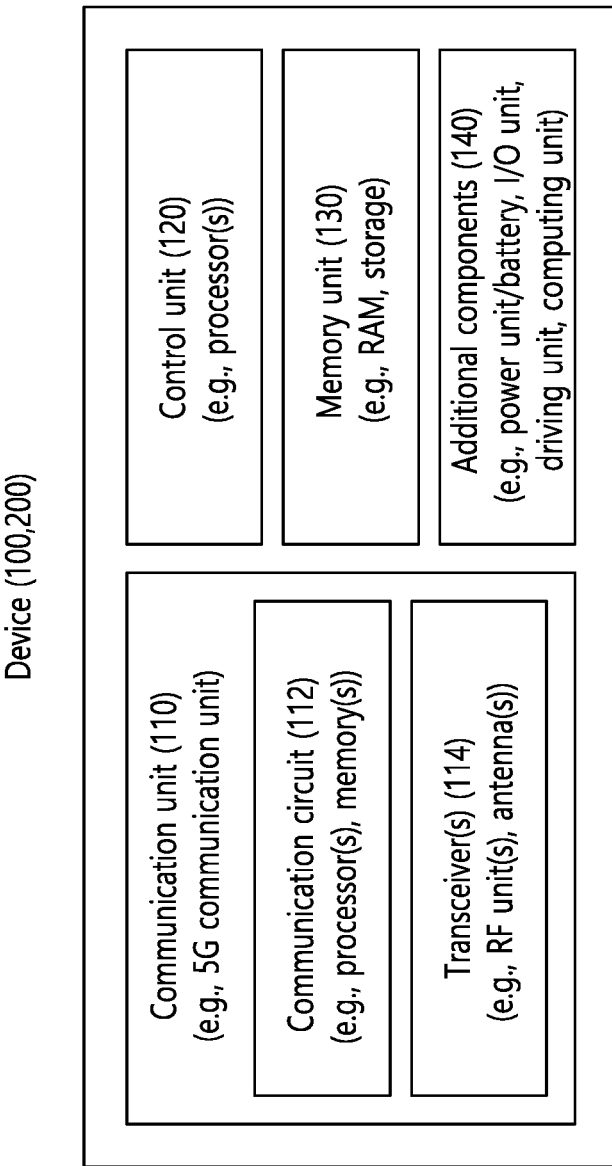
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
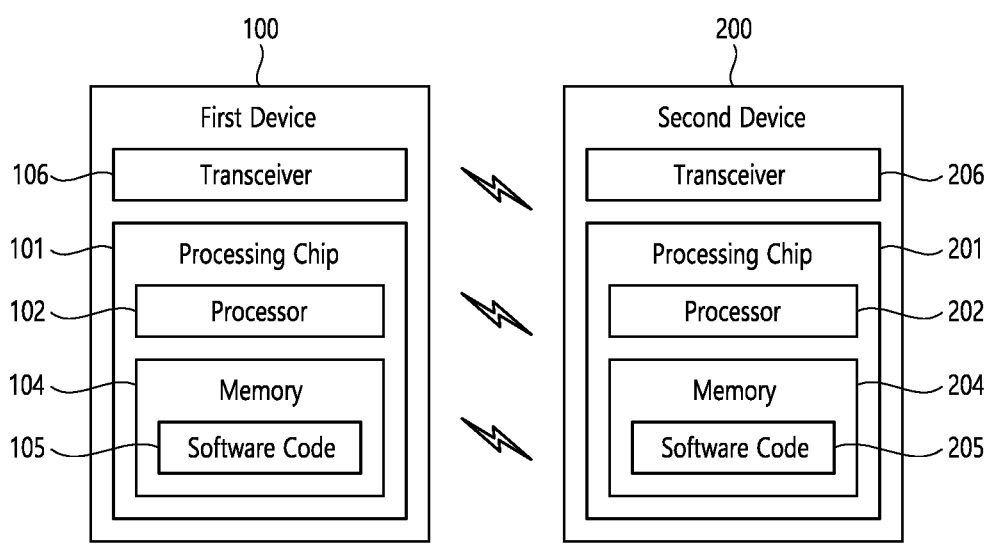
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
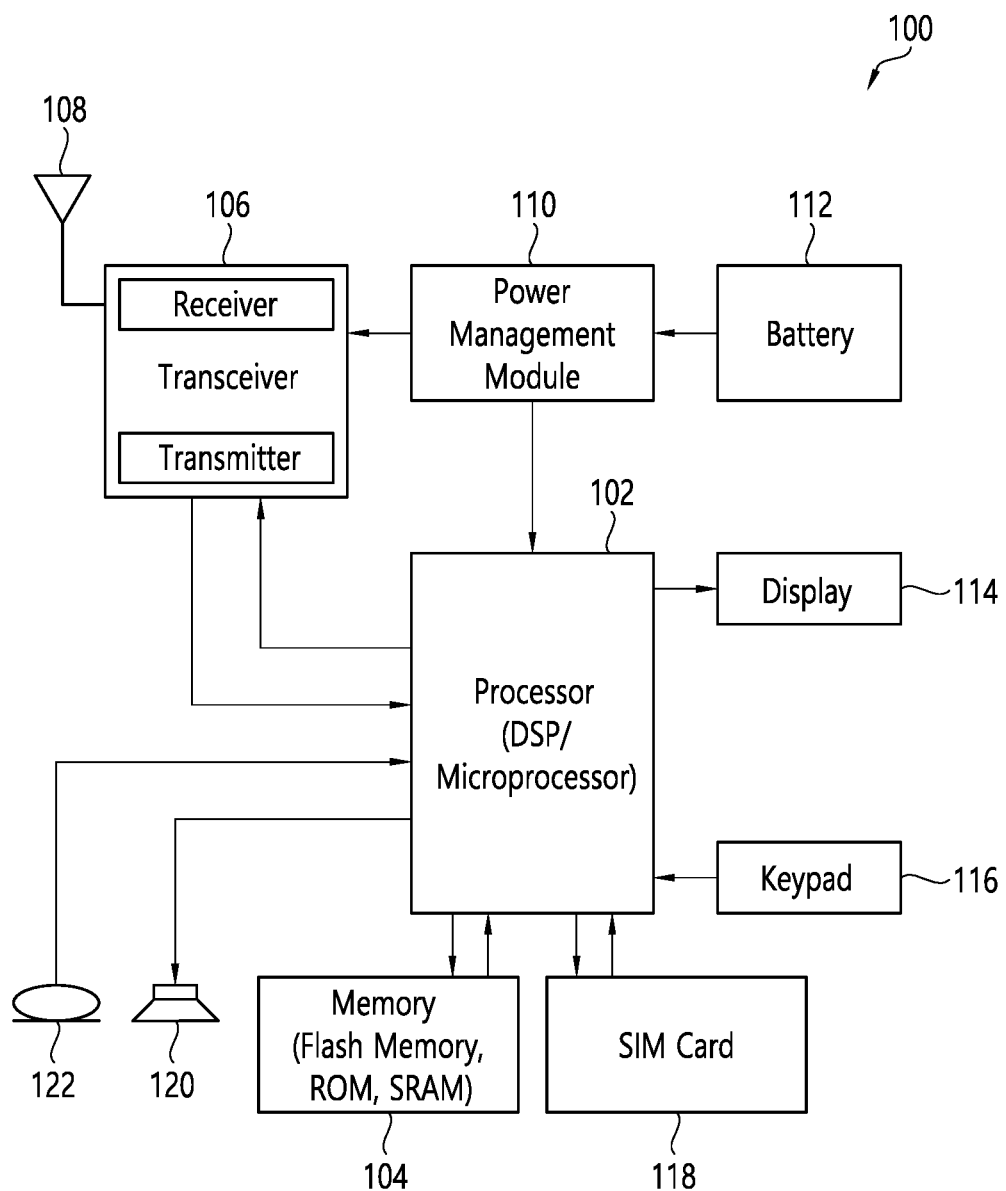
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Hereinafter, an apparatus for handling of missing reference signal on unlicensed frequency in a wireless communication system, according to some embodiments of the present disclosure, will be described.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106. The processor 102 may be configured to control an upper layer of the wireless device to receive, from a lower layer of the wireless device, a first indication related to a first reference signal from a network, wherein the first indication is one of In-Sync (IS) indication or Out-of-Sync (OOS) indication. The processor 102 may be configured to control the upper layer of the wireless device to start a timer. The processor 102 may be configured to control the upper layer of the wireless device to receive, from the lower layer of the wireless device, a second indication while the timer is running, wherein the second indication informs that a second reference signal from the network is missing. The processor 102 may be configured to control the upper layer of the wireless device to increase a counter related to the first indication upon receiving the second indication.

Hereinafter, a processor for a wireless device for handling of missing reference signal on unlicensed frequency in a wireless communication system, according to some embodiments of the present disclosure, will be described.

The processor may be configured to control an upper layer of the wireless device to receive, from a lower layer of the wireless device, a first indication related to a first reference signal from a network, wherein the first indication is one of In-Sync (IS) indication or Out-of-Sync (OOS) indication. The processor may be configured to control the upper layer of the wireless device to start a timer. The processor may be configured to control the upper layer of the wireless device to receive, from the lower layer of the wireless device, a second indication while the timer is running, wherein the second indication informs that a second reference signal from the network is missing. The processor may be configured to control the upper layer of the wireless device to increase a counter related to the first indication upon receiving the second indication.

Hereinafter, a non-transitory computer-readable medium has stored thereon a plurality of instructions for handling of missing reference signal on unlicensed frequency in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device. The stored a plurality of instructions may cause the wireless device to control an upper layer of the wireless device to receive, from a lower layer of the wireless device, a first indication related to a first reference signal from a network, wherein the first indication is one of In-Sync (IS) indication or Out-of-Sync (OOS) indication. The stored a plurality of instructions may cause the wireless device to control the upper layer of the wireless device to start a timer. The stored a plurality of instructions may cause the wireless device to control the upper layer of the wireless device to receive, from the lower layer of the wireless device, a second indication while the timer is running, wherein the second indication informs that a second reference signal from the network is missing. The stored a plurality of instructions may cause the wireless device to control the upper layer of the wireless device to increase a counter related to the first indication upon receiving the second indication.

Figure 6:
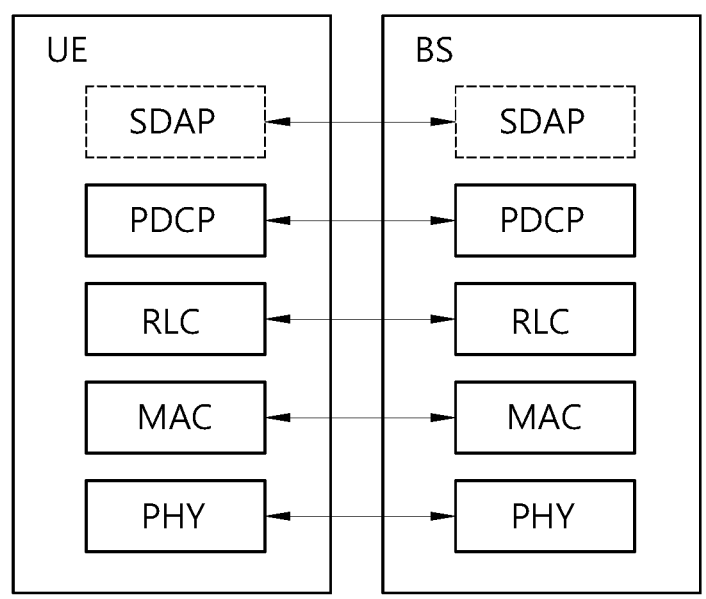
FIGS. 6 and 7 show an example of protocol stacks in a 3GPP based wireless communication system to which implementations of the present disclosure is applied.
Figure 7:
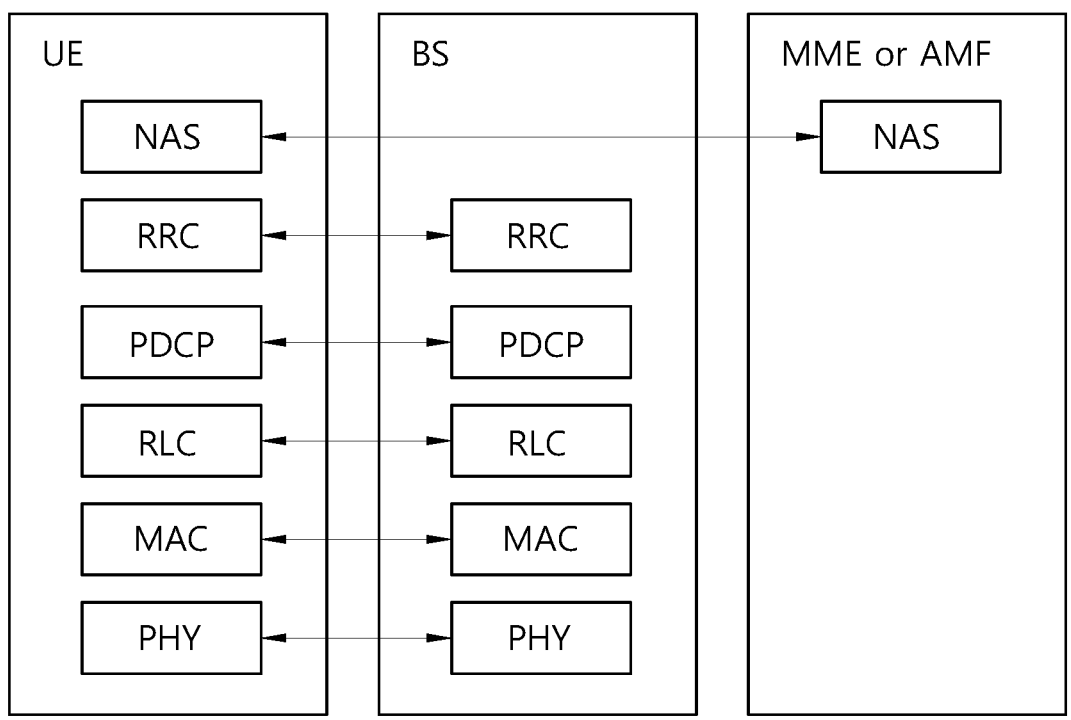

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
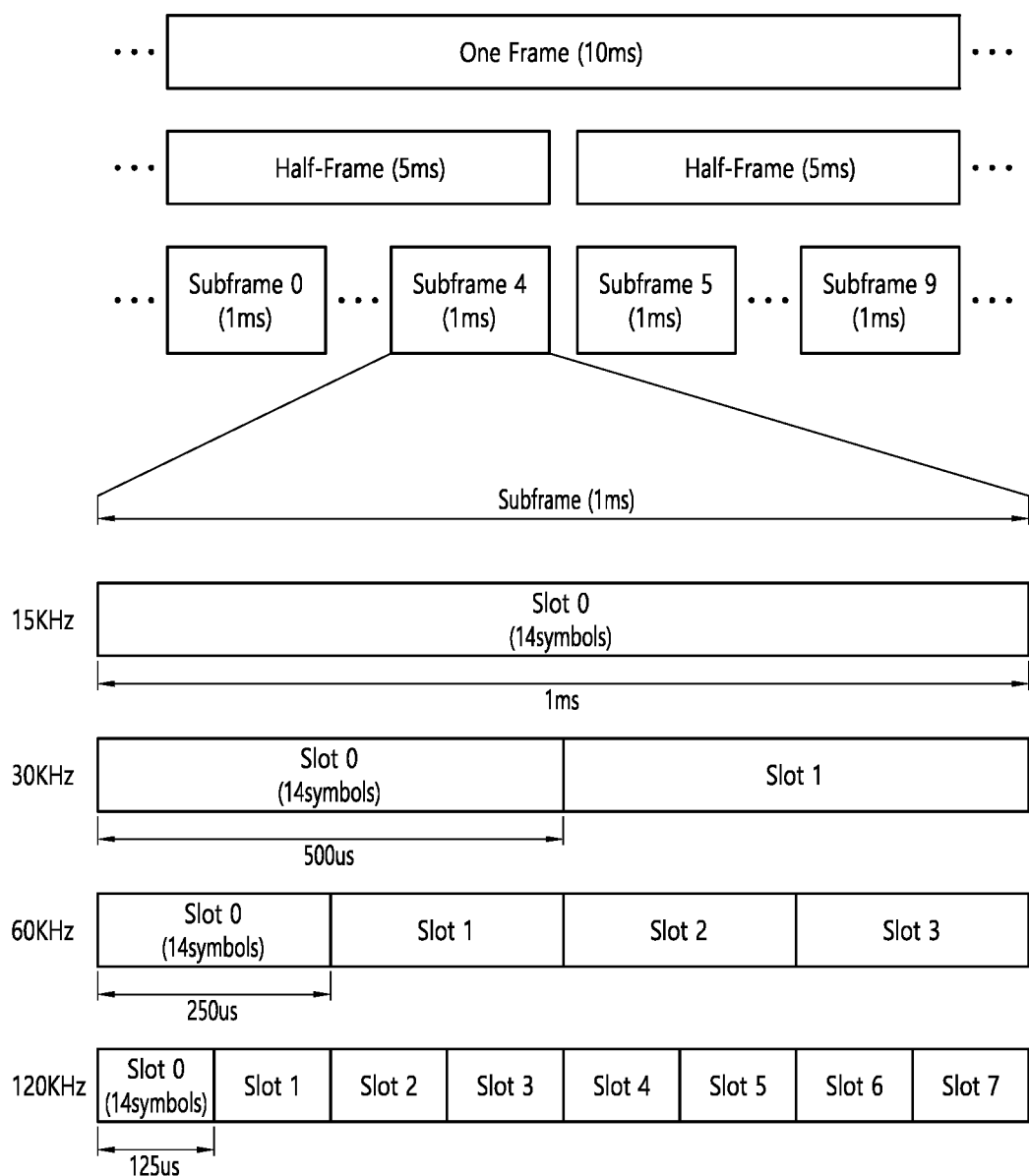
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ carrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index/representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times. In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
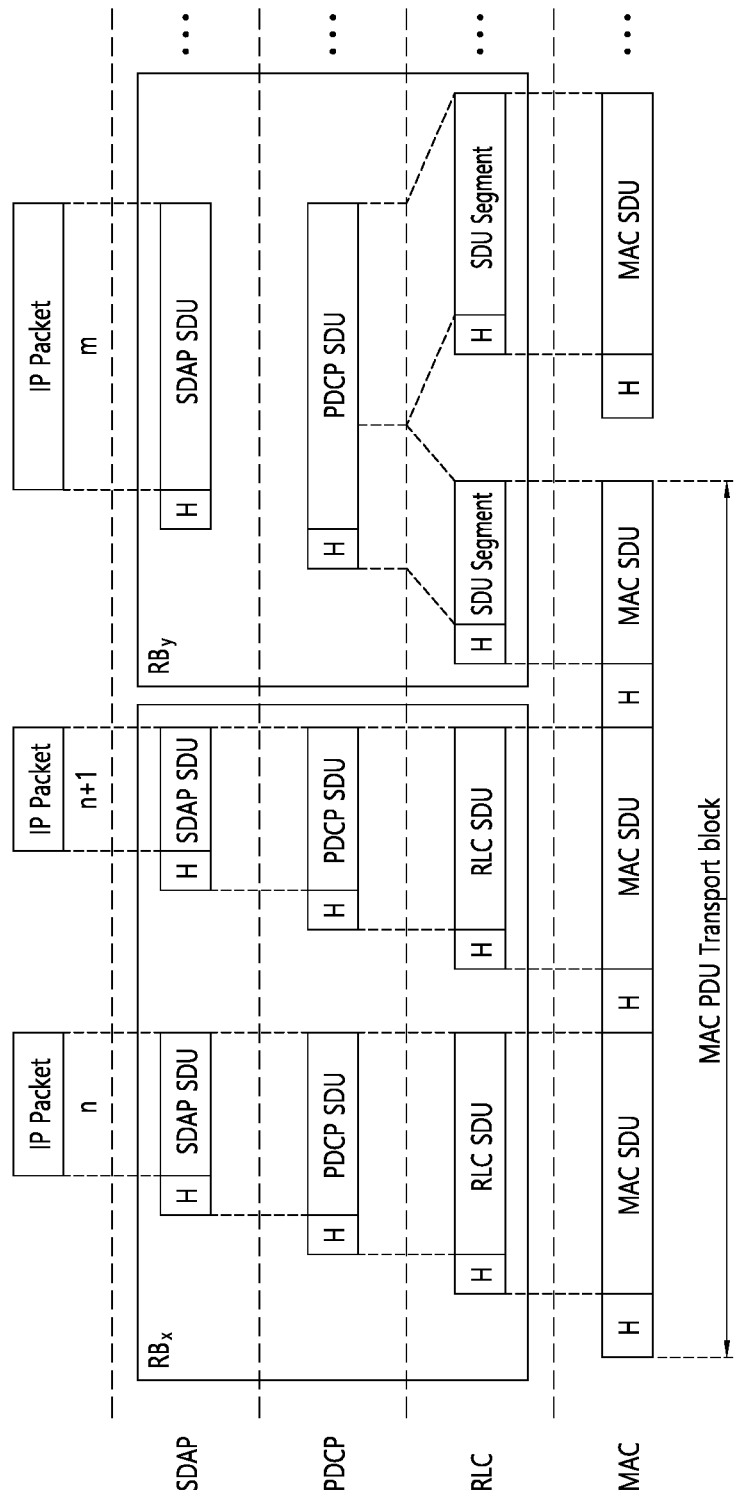
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Licensed-Assisted Access operation is described. It may be referred to as Section 5.7 of 3GPP TS 36.300 v15.3.0 (2018-09).

Carrier aggregation with at least one secondary cell (SCell) operating in the unlicensed spectrum is referred to as licensed-assisted access (LAA). In LAA, the configured set of serving cells for a UE therefore always includes at least one SCell operating in the unlicensed spectrum according to frame structure Type 3, also called LAA SCell. Unless otherwise specified, LAA SCells act as regular SCells.

LAA eNB and UE apply listen-before-talk (LBT) before performing a transmission on LAA SCell. When LBT is applied, the transmitter listens to/senses the channel to determine whether the channel is free or busy. If the channel is determined to be free, the transmitter may perform the transmission. Otherwise, it does not perform the transmission. If an LAA eNB uses channel access signals of other technologies for the purpose of LAA channel access, it shall continue to meet the LAA maximum energy detection threshold requirement.

NR standalone operation on unlicensed bands is described. Technologies of LAA operation described above could be applied to NR standalone operation on unlicensed bands. In LTE LAA, a cell on an unlicensed bands is not considered as primary cell (PCell), but only as secondary cell (SCell). On the other hand, in NR standalone operation on unlicensed bands, a cell on an unlicensed bands can be considered as a PCell.

Hereinafter, radio link failure related actions will be described. It may be referred to as Section 5.3.10 of 3GPP TS 38.331 v15.3.0.

Detection of physical layer problems in RRC_CONNECTED is described.

The UE shall:

1> upon receiving N310 consecutive "out-of-sync" indications for the SpCell from lower layers while neither T300, T301, T304, T311 nor T319 are running:

2> start timer T310 for the corresponding SpCell.

Recovery of physical layer problems are described.

Upon receiving N311 consecutive "in-sync" indications for the SpCell from lower layers while T310 is running, the UE shall:

1> stop timer T310 for the corresponding SpCell.

In this case, the UE maintains the RRC connection without explicit signalling, i.e. the UE maintains the entire radio resource configuration.

Periods in time where neither "in-sync" nor "out-of-sync" is reported by layer 1 do not affect the evaluation of the number of consecutive "in-sync" or "out-of-sync" indications.

Detection of radio link failure is described.

The UE shall:

1> upon T310 expiry in PCell; or

1> upon random access problem indication from MCG MAC while neither T300, T301, T304, T311 nor T319 are running; or 1> upon indication from MCG RLC that the maximum number of retransmissions has been reached:

2> if CA duplication is configured and activated; and for the corresponding logical channel allowedServingCells only includes SCell(s):

3> initiate the failure information procedure to report RLC failure.

2> else:

3> consider radio link failure to be detected for the MCG i.e. RLF;

3> if AS security has not been activated:

4> perform the actions upon going to RRC_IDLE, with release cause 'other';

3> else if AS security has been activated but SRB2 and at least one DRB have not been setup:

4> perform the actions upon going to RRC_IDLE, with release cause 'RRC connection failure';

3> else:

4> initiate the connection re-establishment procedure.

The UE shall:

1> upon T310 expiry in PSCell; or

1> upon random access problem indication from SCG MAC; or

1> upon indication from SCG RLC that the maximum number of retransmissions has been reached:

2> if CA duplication is configured and activated; and for the corresponding logical channel allowedServingCells only includes SCell(s):

3> initiate the failure information procedure to report RLC failure.

2> else:

3> consider radio link failure to be detected for the SCG i.e. SCG-RLF;

3> initiate the SCG failure information procedure to report SCG radio link failure.

Meanwhile, for radio link monitoring (RLM), both SS block based RLM and channel state information-reference signal (CSI-RS) based RLM are supported. A wireless device may determine in-sync (IS) and out-of-sync (OOS) with a cell, based on the radio link monitoring-reference signal (RLM-RS) (for example, SS block or CSI-RS).

On unlicensed frequency, if the channel is busy, the network could not transmit the RLM-RS to the wireless device and a wireless device could not receive the RLM-RS from the network.

While the RLM-RS is missing, the wireless device may not determine the OOS indication or the IS indication. For example, the upper layers (e.g., RRC layer) of the wireless device may not receive the OOS indication or the IS indication from the lower layers (e.g., physical layer) of the wireless device. Therefore, the wireless device could not proceed to monitor the cell while the RLM-RS is missing.

Therefore, to address the above case in which the RLM-RS is missing, new type of indication, referred to as 'missing RS indication, could be provided from lower layers of a wireless device. For example, lower layers of the wireless device may transmit the missing RS indication to the upper layers of the wireless device, when the wireless device detects that the RLM-RS is not transmitted from gNB. For example, UE may detect that RLM-RS is missing based on the SS/PBCH Block Measurement Time Configuration (SMTC). In this case, the PHY layer of the UE may detect that the RLM-RS is missing and transmit, to the RRC layer of the UE, the missing RS indication.

When the missing RS indication is introduced, the following case may happen considering legacy RLF mechanism.

Figure 10:
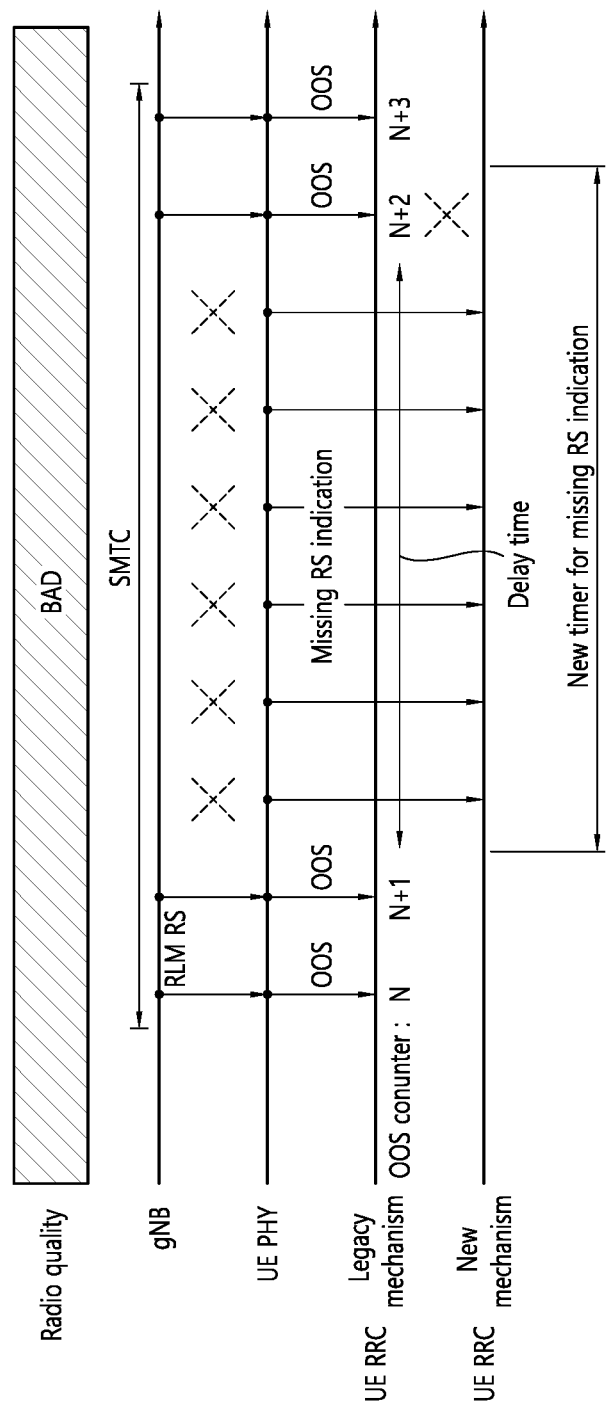
FIG. 10 shows an example of scenario to explain some embodiments of the present disclosure for handling of missing reference signals in a wireless communication system.

FIG. 10 shows an example of scenario to explain some embodiments of the present disclosure for handling of missing reference signals in a wireless communication system. In particular, FIG. 10 shows an example of receiving, from a physical layer of a wireless device, the missing RS indication by an RRC layer of the wireless device. Hereinafter, for convenience of explanation, the original indication may refer to out-of-sync (OOS) indication and/or in-sync (IS) indication.

In FIG. 10, the radio quality of a serving cell (for example, PCell, SpCell, and/or PSCell) on unlicensed frequency could be on bad condition.

A gNB may configure SS/PBCH Block Measurement Time Configuration (SMTC). For example, gNB may transmit the SMTC to the UE. The gNB may transmit, to the UE, RLM RS based on the SMTC.

UE may receive the RLM-RS from the gNB. Since the radio quality of the serving cell is bad, the PHY layer of the UE may transmit, to the RRC layer of the UE, the OOS indication upon receiving the RLM-RS. RRC layer may increase the OOS counter by 1, for example, from N to N+1.

While the RLM-RS is not received from the gNB, the PHY layer of the UE indicates the missing RS indication to the RRC layer of the UE.

The problem may occur when the missing RS indication is indicated for a long time but the OOS indication is indicated before the new timer for the missing RS indication expires. The UE could not increase the OOS counter until the next OOS indication is coming. For example, the RRC layer of the UE may increase the OOS counter by 1 (for example, from N+1 to N+2 and from N+2 to N+3) upon receiving the OOS indications from the PHY layer of the UE based on the RLM-RS.

Since there is no procedures for handling of the missing RLM-RS in the legacy mechanism, the OOS counter may not increase while the RLM-RS is missing. Although the radio quality is still bad, the RLF declaration would be delayed significantly.

Therefore, studies for handling of missing reference signal on unlicensed frequency in a wireless communication system are required.

Hereinafter, a method or apparatus for handling of missing reference signal on unlicensed frequency in a wireless communication system, according to some embodiments of the present disclosure, will be described.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

According to some embodiments of the present disclosure, the upper layers (for example, RRC layer) of the wireless device would be able to take the missing RS indication into account for deciding whether to declare RLF.

According to some embodiments of the present disclosure, the missing RS indication may be considered in the Radio link failure related actions based on T310 to prevent the significant delay. In other words, the missing RS indication should be used as IS indication or OOS indication in the Radio link failure related actions.

It may be quite probable that there is a strong correlation between two link qualities measured at different point of time within a short period of time. Thus, if the missing RS indication is received after receiving a number of consecutive OOS indications, it is likely that the link quality is still bad. Similarly, if the missing RS indication is received after several consecutive IS indications, it is likely that the link quality is still good.

Figure 11:
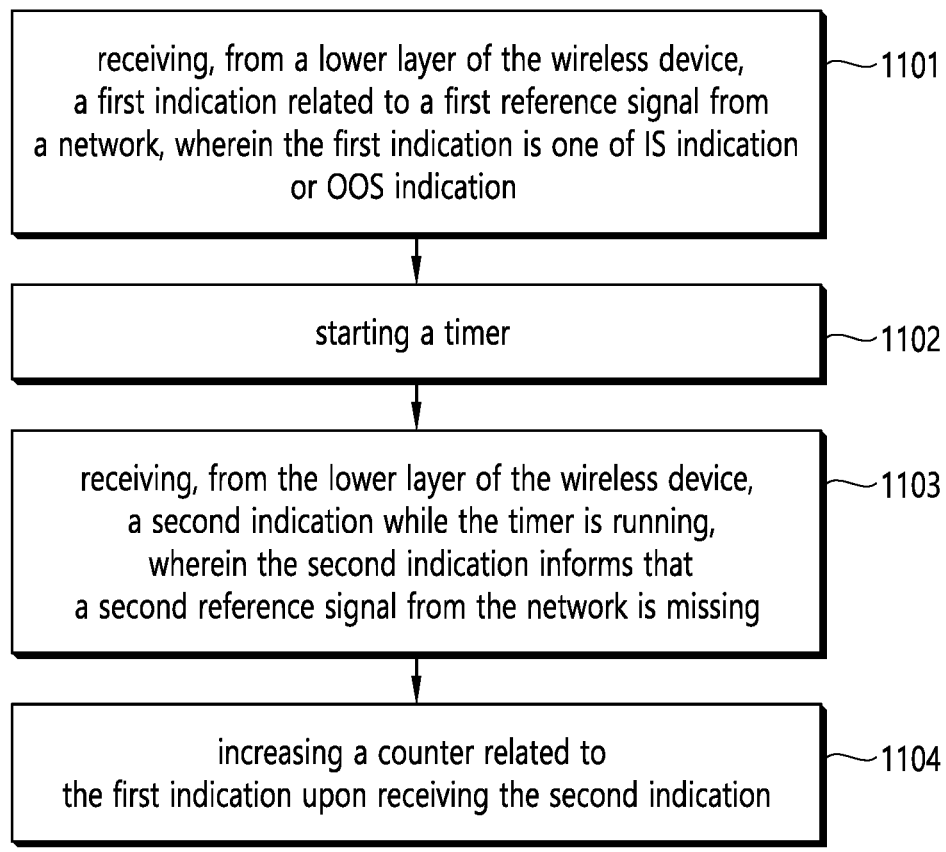
FIG. 11 shows an example of a method for handling of missing reference signal on unlicensed frequency in a wireless communication system, according to some embodiments of the present disclosure.

FIG. 11 shows an example of a method for handling of missing reference signal on unlicensed frequency in a wireless communication system, according to some embodiments of the present disclosure. In particular, FIG. 11 shows an example of a method performed by an upper layer of a wireless device in a wireless communication system. Herein, the upper layer may be an RRC layer and the lower layer may be a PHY layer.

In step 1101, an upper layer of a wireless device may receive, from a lower layer of the wireless device, a first indication related to a first reference signal from a network, wherein the first indication is one of In-Sync (IS) indication or Out-of-Sync (OOS) indication.

For example, the wireless device (for example, the lower layer of the wireless device) may receive reference signals (for example, the first signal) from a cell on unlicensed frequency.

For example, the reference signal from the network is a radio link monitoring reference signal (RLM-RS).

In step 1102, an upper layer of a wireless device may start a timer. For example, the timer may be referred to as 'a correlation timer' or 'a correlation window' below.

For example, a wireless device may start the timer upon receiving the first indication in step 1101.

For another example, a wireless device may re-start the timer upon receiving another IS indication or OOS indication while the timer is running. In other words, the wireless device may receive the fourth indication while the timer is running, wherein the fourth indication is one of the IS indication or the OOS indication. Then, the wireless device may re-start the timer upon receiving the fourth indication.

According to some embodiments of the present disclosure, a wireless device may receive multiple of reference signals. The lower layer of the wireless device may transmit multiple OOS indications or IS indications to the upper layer of the wireless device.

For example, the upper layer of the wireless device may receive, from the lower layer of the wireless device, consecutive OOS indications or consecutives IS indications.

In this case, the upper layer of the wireless device may configure scale of the timer based on number of the consecutive OOS indications or the consecutives IS indications.

For example, when the upper layer receives single OOS indication or single IS indication, the wireless device may configure scale of the timer as a unit scale. When the upper layer receives n consecutive OOS indications or n consecutive IS indications, the wireless device may configure scale of the timer by multiplying the unit scale with a scale factor related to the n consecutive OOS indications or n consecutive IS indications. For example, the wireless device may configure the scale of the timer as n times of the unit scale.

In step 1103, an upper layer of a wireless device may receive, from the lower layer of the wireless device, a second indication while the timer is running, wherein the second indication informs that a second reference signal from the network is missing.

For example, the lower layer of the wireless device may detect that the second RLM-RS is missing and transmit the second indication to the upper layer of the wireless device. The indication informing that the RLM-RS is missing may be referred to as a 'missing RS indication'.

In step 1104, an upper layer of a wireless device may increase a counter related to the first indication upon receiving the second indication. For example, the upper layer may increase the counter related to the first indication by 1 upon receiving the second indication.

For example, if the first indication is the OOS indication, the upper layer of the wireless device may increase an OOS counter upon receiving the missing RS indication while the timer is running.

For example, if the first indication is the IS indication, the upper layer of the wireless device may increase an IS counter upon receiving the missing RS indication while the timer is running.

According to some embodiments of the present disclosure, a wireless device may configure a T310 timer for declaring radio link failure (RLF) with a network. For example, if T310 timer is expired, the wireless device may declare the RLF and perform recovery procedure.

For example, an upper layer of the wireless device may start a T310 timer for declaring radio link failure with the network based on that the OOS counter becomes a preconfigured number. For example, the upper layer may start the T310 timer by receiving the missing RS indication after receiving the OOS indication while the timer is running.

For example, an upper layer of the wireless device may stop a T310 timer for declaring radio link failure with the network based on that the IS counter becomes a preconfigured number. For example, the upper layer may stop the T310 timer by receiving the missing RS indication after receiving the IS indication while the timer is running.

According to some embodiments of the present disclosure, an upper layer of a wireless device may receive the missing RS indication while the timer is not running. In this case, the wireless device may handle the missing RS indication differently.

In other words, an upper layer of a wireless device may receive, from the lower layer of the wireless device, a third indication while the timer is not running. The third indication informs that a third reference signal from the network is missing.

For example, the upper layer of the wireless device may increase an OOS counter related to the OOS indication.

Even though, the first indication is the IS indication, the upper layer of the wireless device may consider the missing RS indication as the OOS indication while the timer is not running.

For another example, the upper layer of the wireless device may ignore the third indication without increasing the counter related to the first indication. Regardless of the first indication, the upper layer of the wireless device may consider the missing RS indication as neither the OOS indication nor the IS indication while the timer is not running.

According to some embodiments of the present disclosure, the wireless device is in communication with at least one of a user equipment, a network, or an autonomous vehicle other than the wireless device.

According to some embodiments of the present disclosure, a wireless device may configure a correlation window. For example, a wireless device may configure the correlation window by itself. For another example, a wireless device may receive configuration of the correlation window from a network.

The correlation window may be a moving window. The correlation window may restart when receiving IS or OOS indication from lower layers of the wireless device.

For example, RRC layer of a wireless device may (re-)start the correlation window when the RRC layer receives the OOS indication or IS indication from lower layers of a wireless device.

For another example, RRC layer of a wireless device may (re-)start the correlation window when the RRC layer receives consecutive N OOS indications or IS indications from lower layer of the wireless device. N may be a threshold valued configured by a network. For example, if the N is set to 3, the RRC layer will start the correlation window when it receives 3 consecutive OOS or IS indications and re-start the correlation window when it receives 4th consecutive OOS or IS indication.

Otherwise, RRC layer of a wireless device may start the correlation window when it receives the missing RS indication from lower layers right after receiving OOS or IS indication. In this case, RRC layer of the wireless device does not start the correlation window when it receives the missing RS indication consecutively.

For example, if an RRC layer of the wireless device receives the missing RS indication within a correlation window and if the indication received when the RLM-RS was lastly detected by the PHY layer of the wireless device is the IS indication (for example, if the original indication received lastly is IS indication), the RRC layer of the wireless device may consider the missing RS indication as IS indication. For example, the RRC layer of the wireless device may increase the number of consecutive IS indication by 1.

For example, if RRC receives the missing RS indication within the correlation window and if the indication received when the RLM-RS was lastly detected is the OOS indication (for example, if the original indication received lastly is OOS indication), the RRC layer of the wireless device may consider the missing RS indication as OOS indication. For example, the RRC layer of the wireless device may increase the number of consecutive OOS indication by 1.

After a certain time from receiving IS or OOS indication, the correlation of link quality measured would be almost zero. It is not desirable that the missing RS indication is considered as the latest OOS or IS indication, outside the correlation window. Therefore, different handling outside the correlation window will be described below.

According to some embodiments of the present disclosure, a wireless device may configure a correlation timer. For example, a wireless device may configure the correlation timer by itself. For another example, a wireless device may receive configuration of the correlation timer from a network.

For example, correlation timer could be used instead of the correlation window, described above.

For example, RRC layer of a wireless device may (re-)start the correlation timer when it receives the OOS indication or IS indication from lower layers of a wireless device.

For another example, RRC layer of a wireless device may (re-)start the correlation timer when it receives consecutive N OOS indications or IS indications from lower layer of the wireless device. N may be a threshold valued configured by a network. For example, if the N is set to 3, the RRC layer will start the correlation timer when it receives 3 consecutive OOS or IS indications and re-start the correlation timer when it receives 4th consecutive OOS or IS indication.

Otherwise, RRC layer of a wireless device may start the correlation timer when it receives the missing RS indication from lower layers right after receiving OOS or IS indication. In this case, RRC layer of the wireless device does not start the correlation timer when it receives the missing RS indication consecutively.

For example, if RRC layer of a wireless device receives the missing RS indication while the correlation timer is running, and if the indication received from lower layer lastly before the correlation timer starts is OOS indication, the UE may consider the missing RS indication as OOS indication (for example, increment the number of consecutive OOS indication by 1).

For example, if RRC layer of a wireless device receives the missing RS indication while the correlation timer is running, and if the indication received from lower layer lastly before the correlation timer starts is IS indication, the UE may consider the missing RS indication as IS indication (for example, increment the number of consecutive IS indication by 1).

According to some embodiments of the present disclosure, a wireless device may configure scale of the correlation window or the correlation timer. For example, a wireless device may configure the scale of the correlation window or the correlation timer by itself. For another example, a wireless device may receive scale of the correlation window or the correlation timer from a network.

The size of the correlation window or the correlation timer could be scaled based on the number of OOS or IS indications received consecutively before receiving the missing RS indication.

UE may configure size of the correlation window or the correlation timer based on consecutive OOS indications.

For example, if UE receives 2 consecutive OOS indications before receiving the missing RS indication (for example, UE may have received IS indication or missing RS indication before receiving 2 consecutive OOS indications), the UE may use unit size of the correlation window or the correlation timer as configured by network or as configured by itself. The UE may configure the unit size of the correlation window or the correlation timer, based on the 2 consecutive OOS indications received before.

For example, if UE receives 4 consecutive OOS indications before receiving the missing RS indication, the UE may scale up the size of the correlation window or the correlation timer by multiplying the configured size (for example, the unit size) by scaling factor associated with the 4 consecutive OOS indications.

For example, if UE receives a single OOS indication before receiving the missing RS indication, the UE may scale down the size of the correlation window or the correlation timer by multiplying the configured size (for example, the unit size) by scaling factor associated with the 1 OOS indication.

UE may configure size of the correlation window or the correlation timer based on consecutive IS indications.

For example, if UE receives 2 consecutive IS indications before receiving the missing RS indication (for example, UE may have received OOS indication or missing RS indication before receiving 2 consecutive IS indications), the UE may use unit size of the correlation window or the correlation timer as configured by network or as configured by itself. The UE may configure the unit size of the correlation window or the correlation timer, based on the 2 consecutive IS indication received before. Herein, the unit size of the correlation timer or the correlation window based on the 2 consecutive IS indications may be same with or different from the unit size of the correlation timer or the correlation window based on the 2 consecutive OOS indications.

For example, if UE receives 4 consecutive IS indications before receiving the missing RS indication, the UE may scale up the size of the correlation window or the correlation timer by multiplying the configured size (for example, the unit size) by scaling factor associated with the 4 consecutive IS indication.

For example, if UE receives a single IS indication before receiving the missing RS indication, the UE may scale down the size of the correlation window or the correlation timer by multiplying the configured size (for example, the unit size) by scaling factor associated with the 1 IS indication.

For example, the scaling factor associated consecutive OOS indications or IS indications may be linearly dependent with the number of consecutive OOS indications or IS indications.

For another example, the scaling factor associated consecutive OOS indications or IS indications may not be linearly dependent with the number of consecutive OOS indications or IS indications. The scaling factor may have a log scale relationship or other relationship with the number of consecutive indications.

According to some embodiments of the present disclosure, a wireless device may handle the missing RS indication outside the correlation window or missing RS indication received while correlation timer is not running.

If the missing RS indication is received even outside the correlation window, this means that the RLM-RS is not transmitted for a long time. No matter how good the link quality is, if gNB fails in downlink LBT consistently, the UE may need to declare RLF to escape from the situation. Therefore, the RRC layer of the wireless device may consider the missing RS indication received outside the correlation window as OOS indication.

For example, RRC layer of the wireless device may consider the missing RS indication received outside the correlation window as OOS indication. For example, if RRC layer of the wireless device receives the missing RS indication outside the correlation window, the RRC layer may increase the consecutive OOS counter by 1.

For example, RRC layer of the wireless device may consider the missing RS indication received while correlation timer is not running as OOS indication. For example, if the RRC layer receives the missing RS indication while correlation timer is not running, the RRC layer may increase the consecutive OOS counter by 1.

Alternatively, UE may ignore the missing RS indication received outside the correlation window as OOS indication or the missing RS indication received while correlation timer is not running.

If the missing RS indication is unconditionally considered as OOS indication, it would result in early RLF declaration or deprive the opportunity to stop T310. Therefore, the RRC layer may not use the missing RS indication received outside the correlation window or the missing RS indication received while the correlation timer is not running as OOS indication or IS indication.

For example, RRC layer may not use the missing RS indication outside the correlation window in the T310 based mechanism. For example, the RRC layer may consider the missing RS indication as neither OOS nor IS.

For example, RRC may not use the missing RS indication received while correlation timer is not running in the T310 based mechanism. For example, the RRC layer may consider the missing RS indication as neither OOS nor IS.

Figure 12:
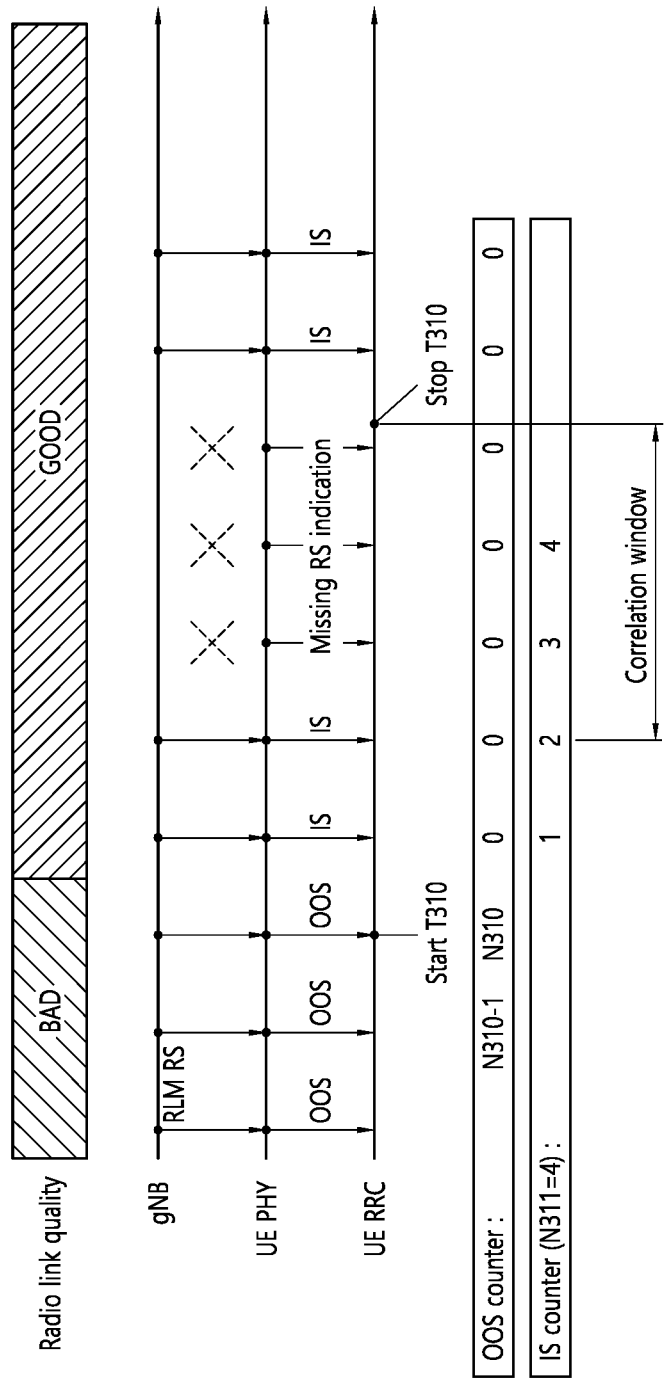
FIG. 12 shows an example scenario of a method for handling of missing reference signal on unlicensed frequency in a wireless communication system, according to some embodiments of the present disclosure.

FIG. 12 shows an example scenario of a method for handling of missing reference signal on unlicensed frequency in a wireless communication system, according to some embodiments of the present disclosure. In particular, FIG. 12 shows an example of the correlation window. The detailed description overlapping with the above-described contents in FIG. 10 will be omitted or simplified.

In FIG. 12, the radio link quality of a serving cell (for example, PCell, SpCell, and/or PSCell) on unlicensed frequency could be changed from bad to good.

If the radio link quality is bad, the PHY layer of the UE may transmit, to the RRC layer of the UE, OOS indication upon receiving the RLM-RS from the gNB. The RRC layer may increase the OOS counter by 1. For example, if the OOS counter becomes N310, which is a preconfigured number, UE may start T310 timer.

If the radio quality is good, the PHY layer of the UE may transmit, to the RRC layer of the UE, IS indication upon receiving the RLM-RS from the gNB. The RRC layer may increase the IS counter by 1. If the IS counter becomes N311, which is a preconfigured number, UE may stop the T310 timer.

However, even though the radio quality of the serving cell is on good condition, if the unlicensed frequency is busy, the RLM-RS could be missing.

In this case, UE may detect that the RLM-RS is missing and the PHY layer of the UE may transmit, to the RRC layer of the UE, the missing RS indication.

Upon receiving the 2 consecutive IS indications, the UE may configure the correlation window and start the correlation window. If the RRC layer receives the missing RS indication in the correlation window, the RRC layer may consider the missing RS indication as the IS indication.

Therefore, the RRC layer may increase the IS counter upon receiving the missing RS indication in the correlation window.

Referring to FIG. 12, the IS counter becomes N311 (for example, 4) in the correlation window, the UE could stop the T310 timer and stop to declare the RLF while the radio link quality of the serving cell is good.

In other words, when the radio link has been recovered while T310 is running, the UE can stop the T310 by considering the missing RS indication as IS indication. Therefore, the UE will not declare unnecessary RLF.

Figure 13:
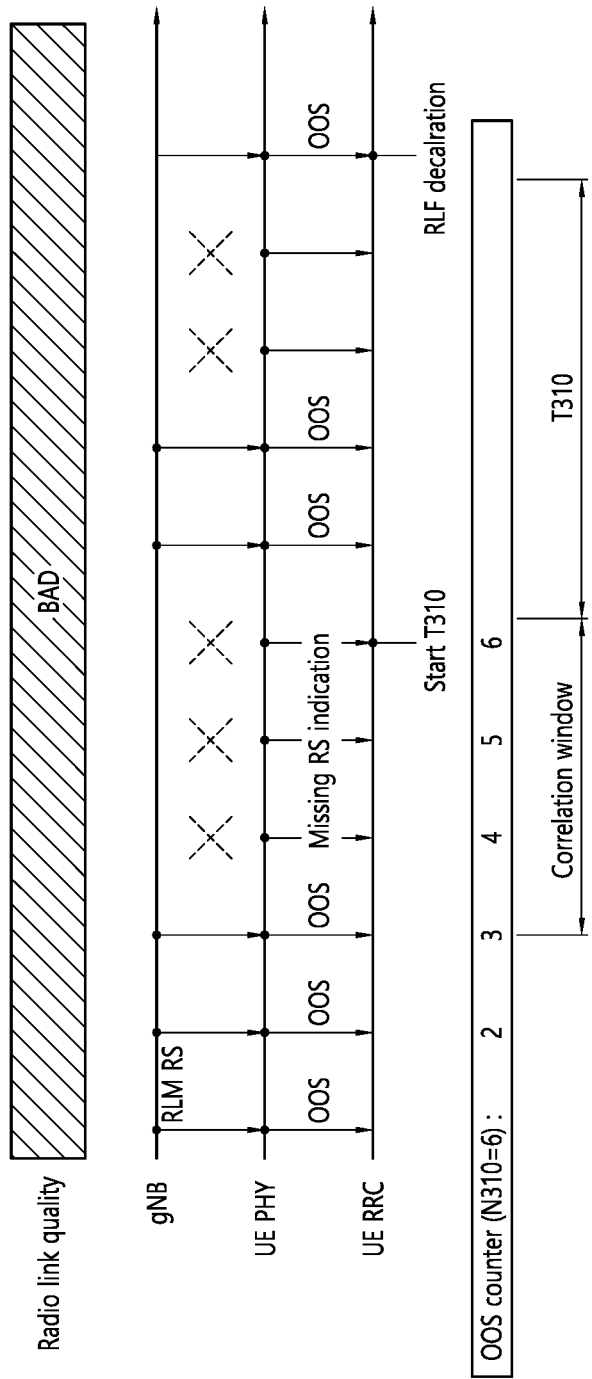
FIG. 13 shows an example scenario of a method for handling of missing reference signal on unlicensed frequency in a wireless communication system, according to some embodiments of the present disclosure.

FIG. 13 shows an example scenario of a method for handling of missing reference signal on unlicensed frequency in a wireless communication system, according to some embodiments of the present disclosure. In particular, FIG. 13 shows an example of the correlation window. The detailed description overlapping with the above-described contents will be omitted or simplified.

In FIG. 13, the radio link quality of a serving cell on unlicensed frequency could be on bad condition.

The PHY layer of the UE may transmit, to the RRC layer of the UE, OOS indication upon receiving the RLM-RS from the gNB. The RRC layer may increase the OOS counter by 1.

If the unlicensed frequency is busy, the RLM-RS could be missing. UE may detect that the RLM-RS is missing and the PHY layer of the UE may transmit, to the RRC layer of the UE, the missing RS indication.

Upon receiving the 3 consecutive OOS indications, the UE may configure the correlation window and start the correlation window. If the RRC layer receives the missing RS indication in the correlation window, the RRC layer may consider the missing RS indication as the OOS indication.

The RRC layer may increase the OOS counter upon receiving the missing RS indication in the correlation window.

When the OOS counter becomes the N310 (for example, 6), in the correlation window, the UE could start the T310 timer. When the T310 timer is expired, the UE may declare RLF and start recovery procedure, for example, RRC connection re-establishment procedure.

In other words, when the missing RS indication is received and the OOS counter is not zero, the UE can start the T310 by considering the missing RS indication as OOS indication. Therefore, the UE can start recovery procedure, for example, RRC connection re-establishment, by declaring the RLF.

The present disclosure can have various advantageous effects.

According to some embodiments of the present disclosure described with reference to FIGS. 10 and 13, a method and apparatus for handling the missing RS indication as IS indication or OOS indication is provided.

For example, a wireless device may configure a correlation window or a correlation timer to consider the missing RS indication as IS indication or OOS indication.

For example, a wireless device may start the T310 timer by considering the missing RS indication as OOS indication, while in the correlation window or the correlation timer is running. Thus, the wireless device may declare RLF and start recovery procedure without unnecessary delay.

For example, a wireless device may stop the T310 timer by considering the missing RS indication as IS indication, while in the correlation window or the correlation timer is running. Thus, the wireless device may not declare unnecessary RLF.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by an upper layer of a wireless device in a wireless communication system, the method comprising, receiving, from a lower layer of the wireless device, consecutive In-Sync (IS) indications related to radio link monitoring-reference signal (RLM-RS) from a network, configuring a first correlation timer upon receiving a last IS indication of the consecutive IS indications, wherein a size of the first correlation timer is configured based on a number of the consecutive IS indications;

starting the first correlation timer;

based on the first correlation timer running, considering a missing reference signal (RS) indication received from the lower layer as an IS indication;

based on the first correlation timer expiring, considering a missing RS indication received from the lower layer as neither an IS indication nor an Out-of-Sinc (OOS) indication;

receiving, from the lower layer consecutive OOS indications related to RLM-RS from the network;

configuring a second correlation timer upon receiving a last OOS indication of the consecutive OOS indications, wherein a size of the second correlation timer is configured based on a number of the consecutive OOS indications;

starting the second correlation timer;

based on the second correlation timer running, considering a missing RS indication received from the lower layer as an OOS indication;

based on the second correlation timer expiring, considering a missing RS indication received from the lower layer as neither an IS indication nor an OOS indication; and declaring a radio link failure based on that a number of the consecutive OOS indications and the missing RS indication considered as the OOS indication is greater than a preconfigured number, wherein the RLM-RS is transmitted from a cell on unlicensed frequency, and wherein the missing RS indication informs that an RS from the network is missing.

2. The method of claim 1, wherein the wireless device is in communication with at least one of a user equipment, a network, or an autonomous vehicle other than the wireless device.

3. A wireless device in a wireless communication system comprising:

a transceiver;

a memory; and at least one processor operatively coupled to the transceiver and the memory, and configured to:

control an upper layer of the wireless device to receive, from a lower layer of the wireless device, consecutive In-Sync (IS) indications related to radio link monitoring-reference signal (RLM-RS) from a network;

control an upper layer of the wireless device to configure a first correlation timer upon receiving a last IS indication of the consecutive IS indications, wherein a size of the first correlation timer is configured based on a number of the consecutive IS indications;
control an upper layer of the wireless device to start the first correlation timer;
based on the first correlation timer running, control an upper layer of the wireless device to consider a missing reference signal (RS) indication received from the lower layer as an IS indication;
based on the first correlation timer expiring, control an upper layer of the wireless device to consider a missing RS indication received from the lower layer as neither an IS indication nor an Out-of-Sinc (OOS) indication;
control an upper layer of the wireless device to receive, from the lower layer, consecutive OOS indications related to RLM-RS from the network;
control an upper layer of the wireless device to configure a second correlation timer upon receiving a last OOS indication of the consecutive OOS indications,
wherein a size of the second correlation timer is configured based on a number of the consecutive OOS indications;
control an upper layer of the wireless device to start the second correlation timer;
based on the second correlation timer running, control an upper layer of the wireless device to consider a missing RS indication received from the lower layer as an OOS indication;
based on the second correlation timer expiring, control an upper layer of the wireless device to consider a missing RS indication received from the lower layer as neither an IS indication nor an OOS indication; and
control an upper layer of the wireless device to declare a radio link failure based on that a number of the consecutive OOS indications and the missing RS indication considered as the OOS indication is greater than a preconfigured number,
wherein the RLM-RS is transmitted from a cell on unlicensed frequency, and
wherein the missing RS indication informs that an RS from the network is missing.

4. A non-transitory computer-readable medium having stored thereon a plurality of instructions, which, when executed by a processor of a wireless device, cause the wireless device to:
control an upper layer of the wireless device to receive, from a lower layer of the wireless device, consecutive In-Sync (IS) indications related to radio link monitoring-reference signal (RLM-RS) from a network;
control an upper layer of the wireless device to configure a first correlation timer upon receiving a last IS indication of the consecutive IS indications,
wherein a size of the first correlation timer is configured based on a number of the consecutive IS indications;
control an upper layer of the wireless device to start the first correlation timer;
based on the first correlation timer running, control an upper layer of the wireless device to consider a missing reference signal (RS) indication received from the lower layer as an IS indication;
based on the first correlation timer expiring, control an upper layer of the wireless device to consider a missing RS indication received from the lower layer as neither an IS indication nor an Out-of-Sinc (OOS) indication;
control an upper layer of the wireless device to receive, from the lower layer, consecutive OOS indications related to RLM-RS from the network;
control an upper layer of the wireless device to configure a second correlation timer upon receiving a last OOS indication of the consecutive OOS indications,
wherein a size of the second correlation timer is configured based on a number of the consecutive OOS indications;
control an upper layer of the wireless device to start the second correlation timer;
based on the second correlation timer running, control an upper layer of the wireless device to consider a missing RS indication received from the lower layer as an OOS indication;
based on the second correlation timer expiring, control an upper layer of the wireless device to consider a missing RS indication received from the lower layer as neither an IS indication nor an OOS indication; and
control an upper layer of the wireless device to declare a radio link failure based on that a number of the consecutive OOS indications and the missing RS indication considered as the OOS indication is greater than a preconfigured number,
wherein the RLM-RS is transmitted from a cell on unlicensed frequency, and
wherein the missing RS indication informs that an RS from the network is missing.

* * * * *